United States Patent
Ando et al.

(10) Patent No.: US 7,698,452 B2
(45) Date of Patent: Apr. 13, 2010

(54) ACCESS-CONTROLLING METHOD, REPEATER, AND SERVER

(75) Inventors: Satoshi Ando, Munakata-Gun (JP); Yuichi Kawaguchi, Kasuya-Gun (JP); Masao Oomoto, Kasuya-Gun (JP); Yuji Shimizu, Koga (JP); Masato Ohura, Iizuka (JP)

(73) Assignee: Panasonic Corporation, Osaka (JP)

( * ) Notice: Subject to any disclaimer, the term of this patent is extended or adjusted under 35 U.S.C. 154(b) by 1044 days.

(21) Appl. No.: 10/809,481

(22) Filed: Mar. 26, 2004

(65) Prior Publication Data

US 2005/0226256 A1 Oct. 13, 2005

(30) Foreign Application Priority Data

Apr. 8, 2003 (JP) ............................. 2003-103760

(51) Int. Cl.
*H04L 12/28* (2006.01)
*G06F 9/455* (2006.01)
*G06F 15/173* (2006.01)
*G06F 15/16* (2006.01)
*G06F 9/44* (2006.01)

(52) U.S. Cl. .................. 709/233; 370/401; 703/24; 709/226; 709/250; 717/170

(58) Field of Classification Search .............. 709/249, 709/226, 233, 250; 713/201; 370/401; 703/24; 717/170
See application file for complete search history.

(56) References Cited

U.S. PATENT DOCUMENTS

| | | | | |
|---|---|---|---|---|
| 5,835,726 | A * | 11/1998 | Shwed et al. ................ | 709/229 |
| 6,111,883 | A * | 8/2000 | Terada et al. ................ | 370/401 |
| 6,321,272 | B1 * | 11/2001 | Swales ...................... | 709/250 |
| 6,996,818 | B2 * | 2/2006 | Jacobi et al. ................ | 717/170 |
| 7,260,635 | B2 * | 8/2007 | Pandya et al. ............... | 709/226 |
| 2002/0077801 | A1 * | 6/2002 | Morehead et al. ............ | 703/24 |

(Continued)

FOREIGN PATENT DOCUMENTS

JP 8-44642 2/1996

(Continued)

OTHER PUBLICATIONS

Paul Ferguson et al., "QoS and TCP/IP: Finding the Common Denominator", Quality of Service, Delivering QoS on the Internet and in Corporate Networks, Chapter 4, pp. 71-83 and 227-228.

(Continued)

*Primary Examiner*—Tonia L Dollinger
*Assistant Examiner*—Anish Sikri
(74) *Attorney, Agent, or Firm*—Wenderoth, Lind & Ponack, L.L.P.

(57) ABSTRACT

The present invention includes a repeater and a server for controlling access, from a terminal of an outside network, to the server of an inside network. The repeater and the server permit a packet transmission from the terminal to the server under limited conditions. When the server acknowledges a connection for the permitted packet, transmission conditions for packets to be sent to the server are loosened. Subsequently, packet transmission between the terminal and the server is controlled under the loosened transmission conditions. As for encrypted packets, the server decodes the encrypted packets and notifies the repeater of relevant information.

8 Claims, 7 Drawing Sheets

U.S. PATENT DOCUMENTS

2005/0022011 A1 * 1/2005 Swander et al. ............. 713/201

FOREIGN PATENT DOCUMENTS

| JP | 10-504168 | 4/1998 |
| JP | 2000-124955 | 4/2000 |
| JP | 2001-057554 | 2/2001 |
| JP | 2003-087332 | 3/2003 |

OTHER PUBLICATIONS

S. Kent et al., "Security Architecture for the Internet Protocol", Network Working Group, RFC 2401, Standards Track, Nov. 1998, pp. 1-66.

S. Deering et al., "Internet Protocol, Version 6 (IPv6) Specification", Network Working Group, RFC 2460, Standards Track, Dec. 1998, pp. 1-39.

I. Miki, "Directivity of Business Is Clear In The Latest Network Technology", Interop Magazine, vol. 10, No. 7, Softbank Publishing Corp., Jul. 1, 2000, pp. 128-136.

* cited by examiner

Fig. 3(a)   * is arbitrary
| flow number | source | | destination | | threshold TH (packet number/s) | measured value (packet number/s) | |
|---|---|---|---|---|---|---|---|
| | address | port number | address | port number | | | |
| 1 | outer address | * | | * | 0 | V1 | t1~t3 |
| 2 | inner address | * | | * | ∞ | V2 | |
| 3 | * | * | A31 | 80 (HTTP) | ∞ | V3 | |
| 4 | * | * | A32 | 110 (POP) | 10 | V4 | |
Fig. 3(b)
| 4 | * | * | A32 | 110 (POP) | 10 | V4 | t4 |
| 5 | A21 | 10001 | A32 | 110 (POP) | 10 | V5 |  |
Fig. 3(c)
| 4 | * | * | A32 | 110 (POP) | 10 | V4 | t4 |
| 5 | A21 | 10001 | A32 | 110 (POP) | ∞ | V5 | |
Fig. 3(d)
| 4 | * | * | A32 | 110 (POP) | 10 | V4 | t10 |
| 5 | A21 | 10001 | A32 | 110 (POP) | ∞ | V5 | |
| 6 | A21 | 10002 | A32 | 25 (MAIL) | ∞ | V6 | |

ACCESS-CONTROLLING METHOD, REPEATER, AND SERVER

BACKGROUND OF THE INVENTION

1. Field of the Invention

The present invention relates to an access-controlling method, a repeater, and a server.

2. Description of the Related Art

First, in this specification, a position where information to be protected and a server which manages the protected information is called an inner position, and a position which communicates via a network is called an outer position in relation to the inner position.

An access control (called a firewall and a packet filtering) is now used in order to protect the inner position from illegal access. Illegal access is, for example, accessing an inner position illegally from the outer position, blocking inner-position service from an outer position, and carrying out confidential information from the inner position to the outer position. Devices which take charge of the access control are one of or both of a server itself which offers service, and a repeater which relays communication to the server (for example, a router etc.).

Prior references regarding the prior access control include reference 1 (published Japanese Patent Application Laid-Open No. Hei 8-44642), reference 2 (Japanese translation of PCT international application No. Hei 10-504168), and reference 3 (published Japanese Patent Application Laid-Open No. 2000-124955).

Prior references regarding bandwidth control in TCP/IP, which is a typical network protocol, IPSec, and FlowLabel of IPv6 include non-patented reference I (reference name: "Internet QoS," coauthored by Paul Ferguson and Geott Huston, translation supervised by Iwao Toda, date of issue: May 5, 2000), non-patented reference 2 (reference name: RFC2401 "IP Encapsulating Security Payload (ESP)," coauthored by S. Kent and R. Atkinson, date of issue: November, 1998), and non-patented reference 3 (reference name: RFC2460 "Internet Protocol, Version6 (IPv6) Specification", coauthored by S. Deering and R. Hinden, date of issue: November, 1998).

(Problem 1) Measures to P2P (Pier-to-Pier) Communication

In the prior access control, control of a choice between two alternatives of whether to transmit a packet or to discard the packet is basically performed.

When a server offers service currently open to the public completely, for example, the WEB service which can be accessed from the Internet, the access control is basically just to transmit the packet to the server.

When the server offers the service with which access is restricted to the fixed range, for example, the file-sharing service by which access is limited in a network in the company, all the packets out of the fixed range are to be discarded.

However, when the server offers mail service to a computer which belongs to an employee who moved outside the company on business trip, the above-described access control cannot deal with the case. It is because, in such a case, an IP address and a port number of the computer which belongs to the employee is changed, if the employee moves outside the company.

With references 1 to 3, some proposals are made to such a subject. However, these proposals are inadequate for P2P communication.

In these references, when the packet is transmitted to an outer position from an inner position, the judging condition of the access control is dynamically changed so that a packet in the reverse direction is allowed to be transmitted in judging transmission/discard of the packet. Thereby, it is supposed that bidirectional communication is performed between the outer position and the inner position.

However, with such an art, unless a packet is transmitted towards the outer position from the inner position, the bidirectional communication cannot be performed. In short, it is impossible to perform bidirectional communication after transmitting a packet to the inner position from the outer position first.

(Problem 2) Vulnerability over a DOS (Denial of Service) Attack

To cope with a problem 1, it is considered to set up a judging condition statically under which a packet that fulfills specific conditions is allowed to be transmitted. However, since an address of a terminal is dynamically set up by DHCP in the present ISP and a hot spot, it is next to impossible to lay down such specific conditions as a matter of fact.

If such a setup is performed, occurrence of DOS attack, by a person with malice who forges a packet which fulfills the judging conditions, cannot be prevented.

In reference 3, usable bandwidth is controlled by using traffic shaping against illegal access of the DOS attack. However, when the packet by illegal access and the packet by legal access are intermingling and flowing, the traffic shaping may result in restricting a bandwidth of communication by the legal access unjustly. Therefore, it is extremely difficult to limit the traffic shaping only to the packet by the illegal access.

(Problem 3) Measures to Encryption

In the prior access control, information in a packet is referred to in judgment of transmission/discard. However, when the packet is encrypted in order to prevent wiretapping by a third person, since the information in the packet cannot be referred to in the access control, the judgment of the transmission/discard becomes impossible.

SUMMARY OF THE INVENTION

An object of the present invention is to offer an access-controlling method which can perform more flexible access control and can correspond to encryption of a packet, and an art related thereto.

A first aspect of the present invention provides an access-controlling method for controlling access of a terminal of an outside network to a server of an inside network using a repeater. The inside network and the outside network being relayed by the repeater, the access-controlling method includes permitting transmission of packets sent by the terminal to the server under limited conditions, changing conditions to generate changed conditions that define packet transmission from the terminal to the server, when the server acknowledges connection between the terminal and the server according to the packets sent under the limited conditions, and controlling the packet transmission from the terminal to the server under the changed conditions.

According to the construction described above, a terminal of the outside network and a server of the inside network can take at least two transmission states besides discarding a packet. One is a state of performing communication restricted according to the limited conditions, and the other is a state of communicating under looser conditions, or severer conditions. Therefore, a more flexible access control can be performed than an alternative access control of the so-called transmission/discard. Furthermore, bidirectional communication can be performed after transmitting the packet to the inner position from the outer position first.

A second aspect of the present invention provides an access-controlling method as described in the first aspect, wherein the limited conditions limit bandwidth of the packet transmission from the terminal to the server within a predetermined range.

According to the construction described above, even when packets by illegal access should reach the server before the server acknowledges connection to the acknowledged packet, adding a limit of the bandwidth restricts the illegal packets in quantity and the server can be protected from the illegal access.

A third aspect of the present invention provides an access-controlling method as described in the first aspect, wherein the packets sent under the limited conditions include authentication information to be sent to the server.

According to the construction described above, transmission of authentication information is made in a state that the limited conditions are imposed. Since only the terminal attested for authentication information can access the server on the changed conditions, the server can be protected from illegal access.

A fourth aspect of the present invention provides an access-controlling method as described in the first aspect, wherein the changing conditions further comprises changing conditions of a flow that is defined using an address of the terminal, an port number of the terminal, an address of the server, and a port number of the server.

According to the construction described above, the access control can be performed only for the corresponding flow, distinguished from the other flows.

A fifth aspect of the present invention provides an access-controlling method for controlling access of a terminal of an outside network to a server of an inside network using a repeater, the inside network and the outside network being relayed by the repeater. The access-controlling method includes receiving encrypted packets from the terminal, decoding the encrypted packets, and notifying access control information concerning the encrypted packets to the repeater.

According to the construction described above, even when the repeater cannot acquire sufficient information to be used for the access control, since packets are encrypted, the repeater can perform an exact access control using a notification from the server.

This information includes correspondence relationship of information of an encrypted portion (an upper-layer protocol class, a source/destination port number) that the repeater cannot refer, and information of the non-encrypted portion (ID of IPv4, and Flow-Label of IPv 5/6) which can be referred to from the repeater.

A sixth aspect of the present invention provides an access-controlling method as described in the first aspect, further including storing access control information in the server, and storing the access control information in the repeater. Further, when the server changes the access control information, the server notifies the repeater that the access control information has changed.

According to the construction described above, when the server tries to change the information independently, a notification is sent from the server. Thereby, consistency of the access control between the server and the repeater is maintained, and unity of the access control as a whole communication system can be maintained.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 3(a)-3(d) are descriptive illustrations showing a transition of a storing unit according to the first embodiment;

DETAILED DESCRIPTION OF THE PREFERRED EMBODIMENTS

Figure 1:
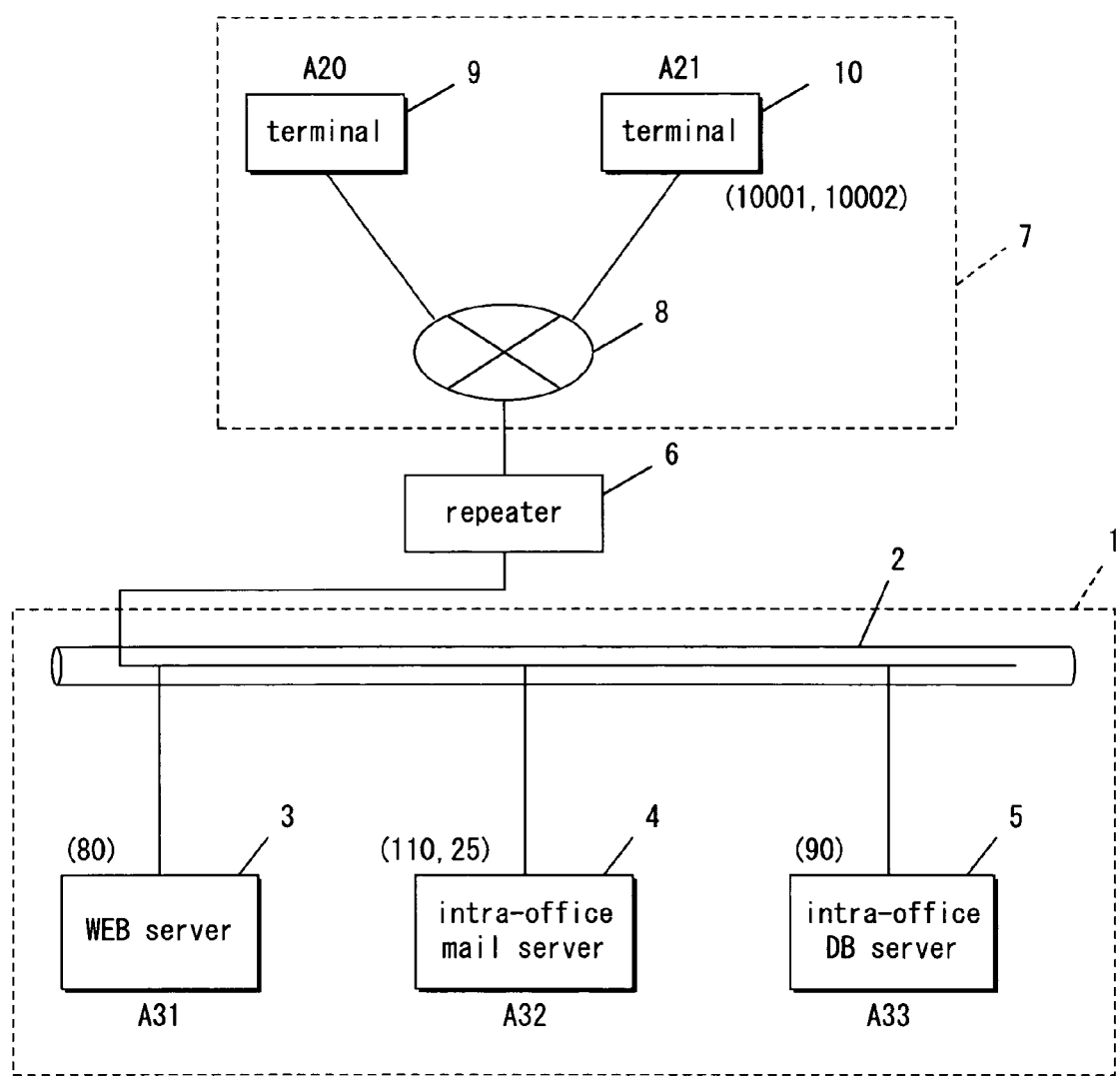
FIG. 1 is a diagram illustrating how a communication system is constructed according to a first embodiment of the present invention.
Figure 2:
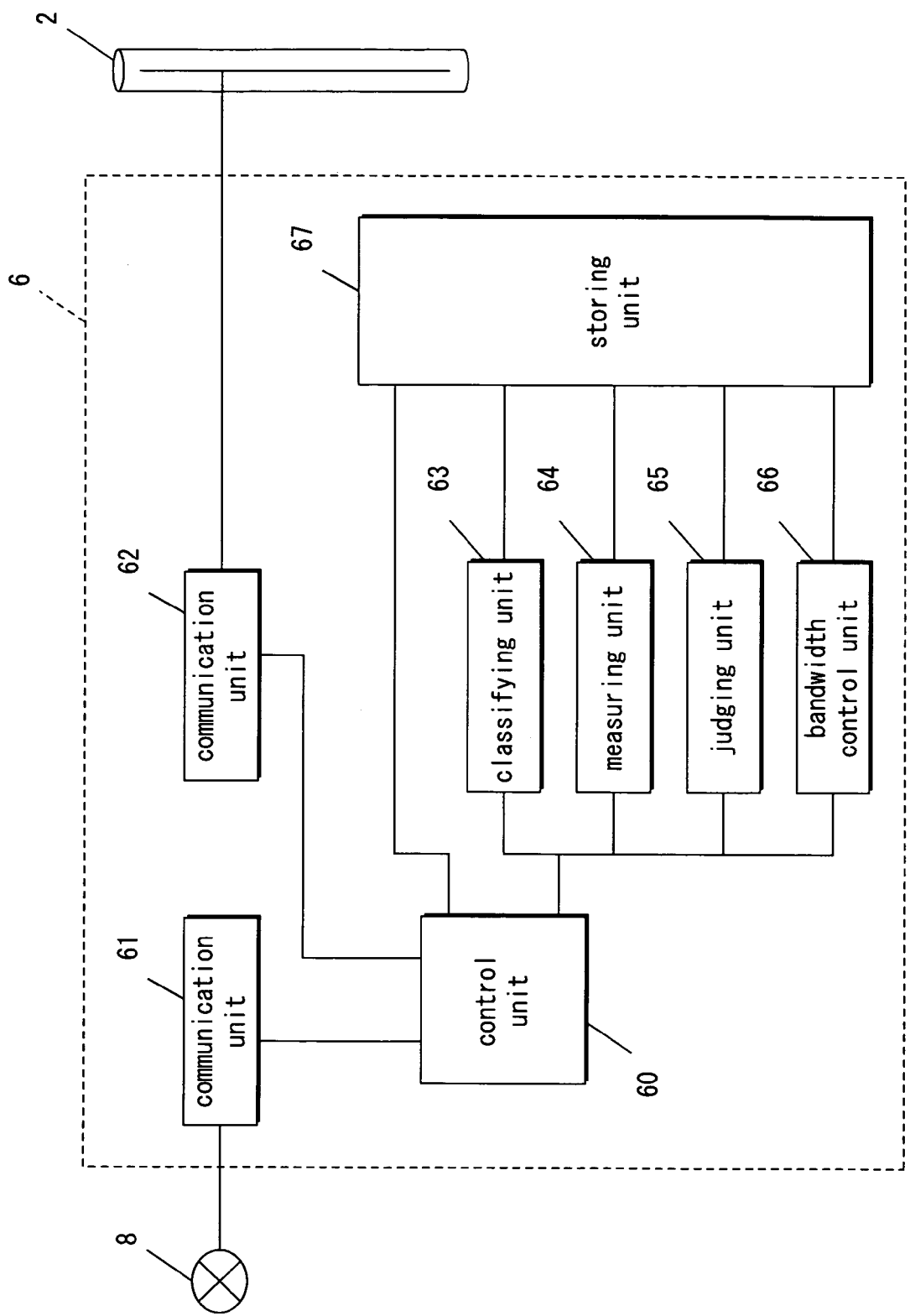
FIG. 2 is a block diagram illustrating a repeater according to the first embodiment.
Figure 5:
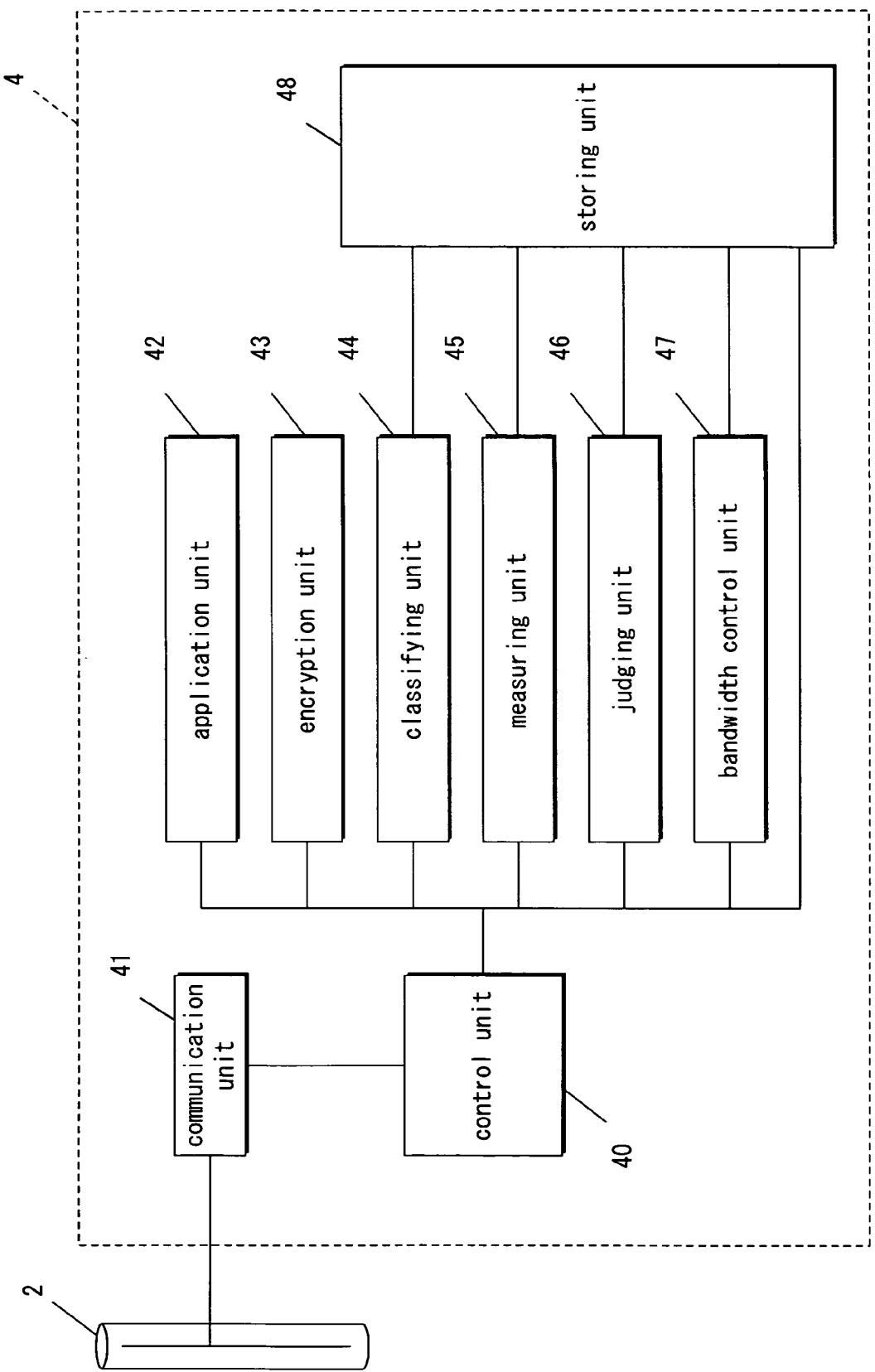
FIG. 5 is a block diagram illustrating the server according to the first embodiment.

Hereinafter, preferred embodiments of the present invention are now explained with reference to the drawings. FIG. 1 is a diagram illustrating how a communication system is constructed according to a first embodiment of the present invention, FIG. 2 is a block diagram of a repeater according to the first embodiment, and FIG. 5 is a block diagram of a WEB server according to the first embodiment.

As shown in FIG. 1, the communication system has an outside network 7 illustrated on the upper-side of a repeater 6 and an inside network 1 illustrated on the lower-side of the repeater 6.

A LAN cable 2 is laid in the inside network 1. The repeater 6, a WEB server 3, an intra-office mail server 4, an intra-office DB server 5, and other client terminals (not illustrated) belonging to the inside network are connected to the LAN cable 2.

The repeater 6 is connected to both networks 8 and the LAN cable 2.

There are the networks 8 in the outside network 7, and a terminal 9 is allowed only to receive WEB service by the WEB server 3. On the other hand, a terminal 10 is a computer which an employee of a company, who usually use the inside network 1, has brought on a business trip. The terminal 10 is allowed to receive service by the WEB server 3 and the intra-office mail server 4.

Service of the intra-office DB server 5 can be used only inside the inside network 1, and access from outside the inside network 1 is forbidden.

Here, an embodiment that the terminal 9 is allowed to use service of the WEB server 3, and forbidden to use service of the intra-office mail server 4 is can realized by the prior alternative access control of the so-called transmission/discard, thereby the explanation regarding this point is omitted.

A problem to be discussed in the present invention is to allow the terminal 10 to use the intra-office mail server 4, protecting the intra-office mail server 4 from illegal access.

The repeater 6 is explained in detail using FIG. 2. First, a control unit 60 controls each component of the repeater 6.

A communication unit 61 is connected to the networks 8 of the outside network 7. A communication unit 62 is connected to the LAN cable 2 of the inside network 1.

A storing unit 67 comprises storage media, such as a memory. As shown in FIG. 3 (*a*), in a state before connection of the terminal 10 is acknowledged, the storing unit 67 stores information which correlatively describes, for every flow number, a flow concerning a packet transmitted via the communication units 61 and 62 (an address and a port number of a source, and an address and a port number of a destination), a threshold TH of a bandwidth of the corresponding flow (in the present embodiment, the number of packets per second is used for the bandwidth), and a measured value Vn of the bandwidth of the corresponding flow. This information is called flow-defining information hereinafter.

Flows for which connection can be acknowledged are defined in the storing unit 67 beforehand, and a flow which is not completely related to anyone of the flows defined in the storing unit 67 is eliminated as illegal access.

A transition of the contents of the storing unit 67 is briefly summarized. A threshold TH of a bandwidth in the storing unit 67 is set as a small value until the intra-office mail server 4 of the inside network 1 acknowledges connection from the terminal 10 of the outside network 7. The threshold TH is changed into a bigger value when the intra-office mail server 4 acknowledges the connection.

As shown in FIG. 3 (*a*), a total of four flows of flow numbers 1 to 4 are defined in the present embodiment. A flow number 1 is related with service of the intra-office DB server 5, and cannot be accessed from any addresses of the outside network 7 (threshold TH=0).

A flow number 2 is related with service leaving from a terminal (a server or a client terminal) belonging to the inside network 1 to the outside network 7, and can access freely from any addresses of the inside network 1 (threshold TH=infinity).

A flow number 3 is related with service of the WEB server 3, and can access freely from any addresses of the outside network 7 (threshold TH=infinity).

A flow number 4 is related with service of the intra-office mail server 4, and can access from any addresses of the outside network 7 under limited conditions (threshold TH=10). This access is limited to a POP in which a protocol classification concerns password transmission.

As described later, the terminal 10 that is going to access the intra-office mail server 4 sends a packet according to the flow number 4 to the intra-office mail server 4 under fixed conditions. The conditions are greatly loosened, after the intra-office mail server 4 issues an explicit packet which acknowledges the communication (a packet of which the SYN-ACK flag is turned on).

In FIG. 2, a classifying unit 63 classifies a flow of packets according to the flow-defining information stored by the storing unit 67.

A measuring unit 64 measures a bandwidth of a classified flow, and stores the measured value in the field of "measured value" of the corresponding flow number in the storing unit 67.

A judging unit 65 compares (i) a measured value Vn and (ii) a threshold TH of the bandwidth, which are both stored in the storing unit 67 regarding the classified flow, and makes a judgment to transmit when Vn<=TH, otherwise makes a judgment to discard.

Hereinafter, in order to simplify explanation, the judging unit 65 is assumed to make only two kinds of judgments: "transmitting" and "discarding." However, there are cases in which the judging unit 65 does not make the judgment of "discarding" a packet, but may make judgment of delaying transmission of the packet or changing priority of the packet. These alternatives are also included in the present invention.

In a bandwidth control unit 66, packets that a judging unit 65 has judged to transmit are set. The bandwidth control unit 66 sends the packets from the communication units 61 and 62 one by one according to a rule of the bandwidth control, unless the packets are discarded in the bandwidth control unit 66.

A bandwidth control method in the bandwidth control unit 66 of the present embodiment is arbitrary. For example, queuing such as FIFO, RED and RIO, and schedulers such as PQ and WRR can be freely chosen for use.

Next, the intra-office mail server 4 is explained in detail using FIG. 5. First, a control unit 40 controls each component of the intra-office mail server 4. A communication unit 41 is connected to a LAN cable 2.

A storing unit 48 comprises storage media, such as a memory, and has the same contents as the storing unit 67 of the repeater 6 has. Although the contents of the storing unit 48 and the contents of the storing unit 67 may not agree with each other temporarily, the disagreement of this information will be immediately fixed by a change notice mentioned later. Of course, the transition of the storing unit 48 is basically the same as that of the storing unit 67.

An application unit 42 executes an application (mail service) that realizes the function as the intra-office mail server 4.

An encryption unit 43 decodes an encrypted packet. The information relating to the encrypted packet and usable for an access control is notified to the repeater 6 via the communication unit 41.

In the packet that is encrypted by IP-Sec etc., even information that is necessary for classifying the packet will be encrypted during the access control. Therefore, the classification of the packet becomes imperfect. The information that is necessary for the access control can be acquired only by the intra-office mail server 4 of the source or the destination. The intra-office mail server 4 can decode the encrypted packet.

In the IP of the version 6 for the TCP/IP, a flow label is introduced in order to enable the classification of packets even when two or more such encrypted packets are intermingled. However, only the source/destination terminals can judge, in terms of the flow label, a relation with the source/destination port number that is encrypted.

In the present embodiment, the encryption unit 43 is provided in the intra-office mail server 4. When the information necessary for classification in the access control is acquired from the packet that is decoded, the information is not only held at the intra-office mail server 4, but also notified to the repeater 6. Thereby, the consistency for classification processing of the repeater 6 and the classification processing of the intra-office mail server 4 is maintained.

In FIG. 5, a classifying unit 44, a measuring unit 45, a judging unit 46, and a bandwidth control unit 47 are the same as those of the classifying unit 63, the measuring unit 64, the judging unit 65, and the bandwidth control unit 66 in FIG. 2.

Thus, the classifying unit 44 classifies the flow of the packets according to the flow-defining information stored in the storing unit 48.

The measuring unit 45 measures a bandwidth of the flow that is classified, and stores the measured value Vn in the field of "measured value" of the corresponding flow number in the storing unit 48.

As for the classified flow, the judging unit 46 compares the measured value Vn and the threshold TH of the bandwidth that are stored in the storing unit 48. If Vn<=TH, the judging unit 46 makes the judgment of "transmitting". Otherwise, the judging unit 48 makes the judgment of "discarding".

Packets that are made judgment of "transmitting" by the judging unit 45 are set in the bandwidth control unit 47. The bandwidth control unit 47 sends the packets one by one from the communication unit 41 according to a rule of the bandwidth control, as long as the bandwidth control unit 47 does not discard the packets in itself.

The bandwidth control method in the bandwidth control unit 47 of the present embodiment is arbitrary. For example, queuing such as FIFO, RED and RIO, and schedulers such as PQ and WRR can be freely chosen to use.

(Change Notice)

In packet exchange communication, there are two methods: (i) connection-oriented communication, which notifies connection request and explicit acknowledgment to the connection request; and (ii) connectionless communication, which does not notify connection request or explicit acknowledgment to the connection request.

In TCP/IP, which is currently the most spread-out communication protocol of the Internet, TCP is the connection-oriented communication, and UDP is the connectionless communication.

In TCP and UDP communication, in order to perform plural communications independently between a pair of terminals (a server is included in the terminals), the terminals assign a port number for each communication.

The classifying unit 63 of the repeater 6 refers to the source/destination address, a source/destination port, and the upper-layer protocol class that indicates either TCP or UDP communication. Thus, the classifying unit 63 of the repeater 6 is able to classify the plural communications.

In TCP connection-oriented communication, the intra-office mail server 4, which has received a packet (a packet whose SYN flag in the TCP flag is "ON") that requests the connection, sends a packet (a packet whose SYN-ACK flag is "ON" or a packet whose ACK flag in "ON") that acknowledges the connection when the connection is acknowledged.

On the other hand, when the connection is not acknowledged, the intra-office mail server 4 sends a packet (a packet whose FIN flag in the TCP flag is "ON") indicating that the connection is not acknowledged.

In TCP/IP communication, to indicate explicitly that the connection is not acknowledged, a message of "Destination Unreachable" of ICMP may be sent in response, in addition to the FIN packet of the TCP. Sending the message is commonly used in TCP and UDP communication.

UDP is the connectionless communication which does not send or receive a packet requesting connection or a packet explicitly indicating acknowledged connection/not-acknowledged connection. In UDP communication, a packet may be used as a trigger for sending and receiving by referring to a set of source/destination address and source/destination port number of the packet.

Since the connectionless communication does not send or receive a packet requesting connection or a packet explicitly indicating acknowledged connection/not-acknowledged connection, the judgment of the access control in the connectionless communication may become less accurate.

In the present embodiment, when the intra-office mail server 4 makes an explicit acknowledgment of a connection to the terminal 10, irrelevant to the intention of the repeater 6, a change notice is issued from the intra-office mail server 4 to the repeater 6. Thereby, the storing unit 67 of the repeater 6 and the storing unit 48 of the intra-office mail server 4 can share the same information.

If the change notice is used in a better way, the information of the access control may be held by the repeater 6 and the intra-office mail server 4 in a distributed manner. This feature is worthy to note, compared to the prior method in which the repeater 6 must have all the information regarding the access control. This feature reduces the amount of information that the repeater 6 should possess and also reduces processing burdens of the repeater 6. In the repeater 6, it is not necessary to hold the information of the flow that is not transmitted. Therefore, the processing burdens can be further reduced.

By use of the change notice, the agreement of the contents of processing for the bandwidth control between the intra-office mail server 4 and the repeater 6 is securable.

Thus, the following unfavorable situations can be prevented (i) a situation that a packet, which has reached from the intra-office mail server 4 to the repeater 6, is discarded by the repeater 6 because of insufficient bandwidth, or (ii) a situation that a bandwidth required by other flow is pressed because the outward bandwidth is secured too much by the repeater 6.

(Bandwidth Control)

In a packet exchanging network, bandwidth control can be performed only by a sending side of packets because of restrictions due to the system.

Therefore, as for a packet from the intra-office mail server 4 to the repeater 6, the bandwidth control can be performed only by the intra-office mail server 4, but as for a packet from the repeater 6 to the intra-office mail server 4, the bandwidth control can be performed only by the repeater 6.

In the present embodiment, the bandwidth control units are provided in both the repeater 6 and the intra-office mail server 4, in order to prevent the bandwidth of the intra-office mail server 4 from being used illegally by responding to an illegal access from outside.

Figure 4:
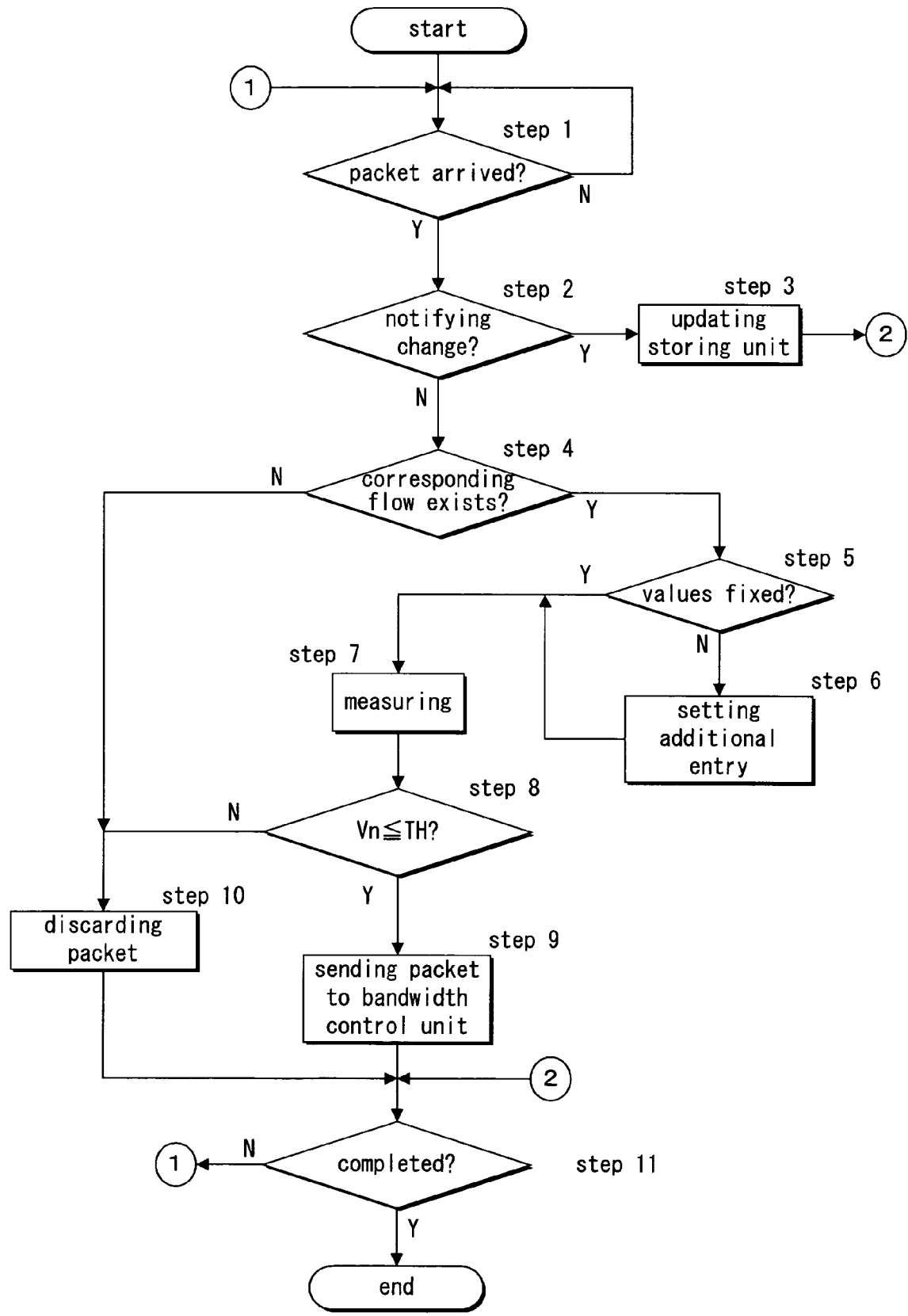
FIG. 4 is a flowchart illustrating the repeater according to the first embodiment.

Next, operation of the repeater 6 is explained referring to FIG. 4. First at Step 1, the control unit 60 waits for a packet to arrive at the communication unit 61 or the communication unit 62.

At Step 2, when a packet arrives, the packet is confirmed whether or not it is a change notice from the intra-office mail server 4. If the packet is a change notice, at Step 3, the control unit 60 updates the contents of the storing unit 67 as the change notice describes. Thereby, the consistency of the contents for the storing unit 67 and the contents of the storing unit 48 is guaranteed.

If the packet is not a change notice, at Step 4, the control unit 60 orders the classifying unit 63 to perform classification. Then, the classifying unit 63 confirms whether or not a flow corresponding to the packet exists in the storing unit 67.

If the corresponding flow exists, at Step 5, the classifying unit 63 confirms whether or not each value (the address, the port number, etc. regarding the source and the destination) of the flow is fixed. The classifying unit 63 starts the confirmation from a flow with the largest flow number to a flow with smaller flow number, as arrows in FIG. 3 show. That the value is not fixed in the confirmation means that the value is uncertain, as shown by a symbol "*" in FIG. 3.

When the values are not fixed, at Step 6, the classifying unit 63 adds a new entry (a flow number becomes the number that "1" is added to the largest flow number for the moment), and sets each value (the address, the port number, etc. regarding the source and the destination) that is acquired from the packet of the new entry, and moves the processing to Step 7. When the values are fixed, the classifying unit 63 moves the processing from Step 5 to Step 7, since it is not necessary to add a new flow.

At Step 4, if no corresponding flow exists, there is a possibility of illegal access. Therefore, the classifying unit 63 stops the classification and sends a notice of the possibility of illegal access to the control unit 60. Upon receipt of the notice, the control unit 60 moves the processing to Step 10 immediately and discards the packet.

At Step 7, the measuring unit 64 measures the transmission speed of a corresponding flow, and the measured value Vn is set to the field of the measured value of the corresponding flow.

At Step 8, the judging unit 65 compares the measured value Vn and the threshold TH of the corresponding flow. If Vn<=TH, the judging unit 65 makes the judgment of "transmitting", and the packet is outputted to the bandwidth control unit 66. Then, following the bandwidth control method, the bandwidth control unit 66 outputs the packet via the communication unit 61 or the communication unit 62, as long as the bandwidth control unit 66 by itself does not discard the packet.

Otherwise, the judging unit 65 makes the judgment of "discarding", and the packet is discarded without being outputted to the bandwidth control unit 66.

Then, the processing after Step 1 is repeated until the processing is completed (Step 11).

Figure 6:
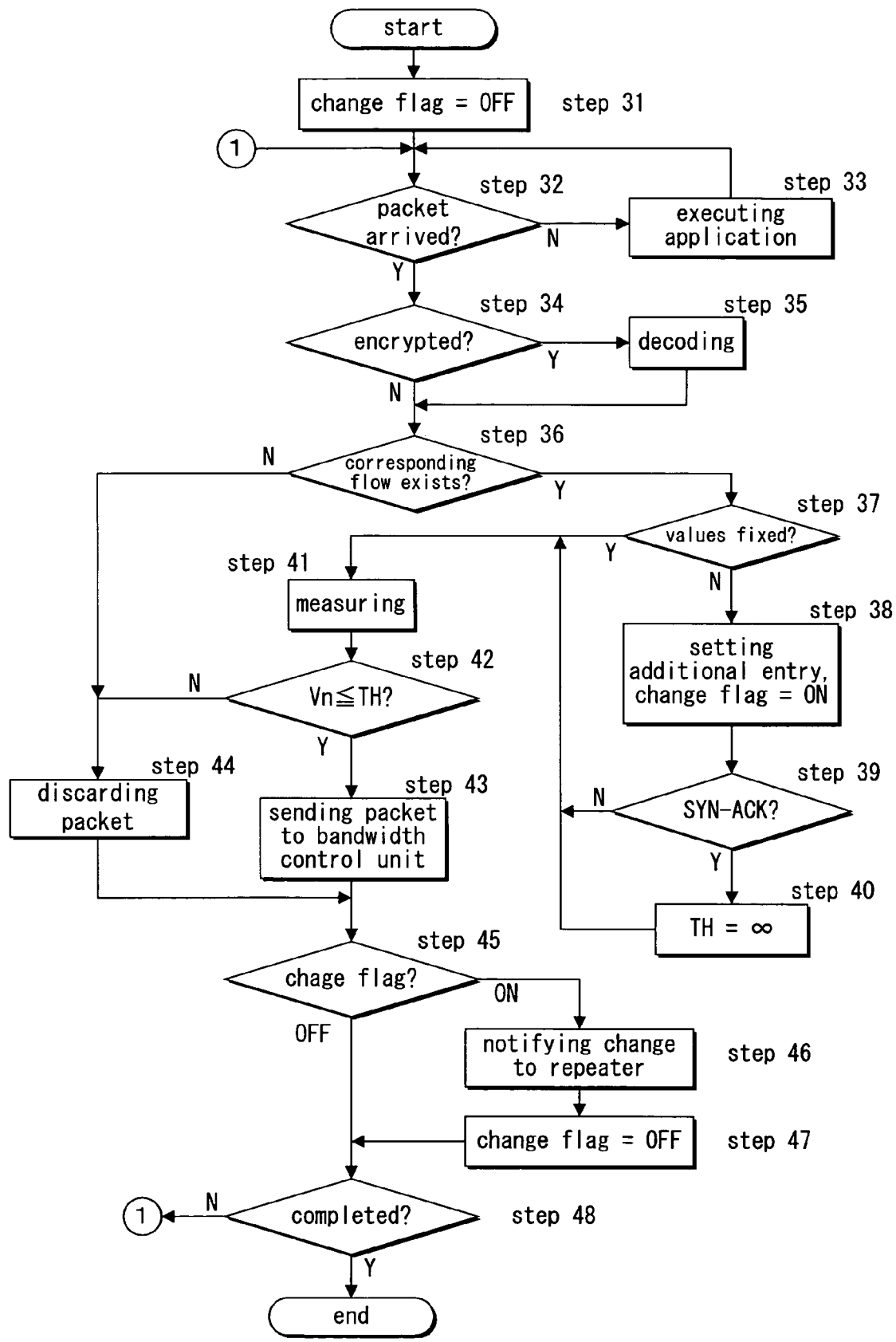
FIG. 6 is a flowchart illustrating the server according to the first embodiment.

Next, operation of the intra-office mail server 4 is explained using FIG. 6. At step 31, the control unit 40 sets "OFF" as an initial value to a change flag. The flag indicates whether or not contents of the storing unit 48 have changed by the decision of intra-office mail server 4. "ON" means that the contents have changed, and "OFF" means that the contents have not changed. If the flag is "ON", it means that there is disagreement between the contents of the storing unit 48 and the contents of the storing unit 67. Thus, a change notice is supposed to be issued for the repeater 6 at the appropriate timing (Step 46).

At Step 32, the control unit 40 waits for a packet to arrive at the communication unit 41. At Step 33, the control unit 40 performs processing of an application using the application unit 42 until a packet arrives.

When a packet arrives, at Step 34, the packet is confirmed whether it has been encrypted or not. If the packet has been encrypted, the control unit 40 makes the encryption unit 43 decode the packet at Step 35, and moves the processing to Step 36. If the packet is not encrypted, the control unit 40 moves the processing to Step 36 from Step 34.

Next, at Step 36, the control unit 40 orders the classifying unit 44 to perform classification. Then, the classifying unit 44 confirms whether or not a flow corresponding to the packet exists in the storing unit 48.

If the flow exists, the classifying unit 44 confirms whether each value (the address, the port number, etc. regarding the source and the destination) of the flow is fixed or not at Step 37. As well as the classifying unit 63, the classifying unit 44 starts the confirmation from a flow with the largest flow number to a flow with smaller flow number, as arrows in FIG. 3 show. That the value is not fixed in the confirmation means that the value is uncertain, as shown by a symbol "*" in FIG. 3.

When the values are not fixed, at Step 38, the classifying unit 44 adds a new entry (a flow number becomes the number that "1" is added to the largest number for the moment), and sets each value (the address, the port number, etc. regarding the source and the destination) that is acquired from the packet of the new entry. The change flag is set to "ON", since disagreement between the contents of the storing unit 48 and the contents of the storing unit 67 may occur due to the processing at Step 38.

Then, the processing is moved to Step 39. At Step 39, the classifying unit 44 confirms the control unit 40 whether the packet, whose flag of SYN-ACK acknowledging the connection to the terminal 10 is "ON", will be sent or not. If the packet is sent, at Step 40, in the storing unit 48, the value of infinity (communication is accepted freely) is set to the threshold TH of the corresponding flow in order to loosen the limited conditions of the corresponding flow, and then the processing is moved to Step 41. If the packet is not sent, the classifying unit 44 moves the processing to Step 41 from Step 39.

At Step 37, if the values are fixed, the classifying unit 44 moves the processing from Step 37 to Step 41, since it is not necessary to add a new flow.

At Step 36, if no corresponding flow exists, there is a possibility of illegal access. Therefore, the classifying unit 44 stops the classification and sends a notice of the possibility of illegal access to the control unit 40. Upon receipt of the notice, the control unit 40 moves the processing to Step 44 immediately and discards the packet.

At Step 41, the measuring unit 45 measures the transmission speed of the corresponding flow, and the measured value Vn is set to the field of the measured value of the corresponding flow.

At Step 42, the judging unit 46 compares the measured value Vn and the threshold TH of the corresponding flows. If Vn<=TH, the judging unit 46 makes the judgment of "transmitting", and the packet is outputted to the bandwidth control unit 47. Then, following the bandwidth control method, the bandwidth control unit 47 outputs the packet via the communication unit 41, as long as the bandwidth control unit 47 by itself does not discard the packet.

Otherwise, the judging unit 46 makes the judgment of "discarding", and the packet is discarded without being outputted to the bandwidth control unit 47.

Then, the processing after Step 32 is repeated until the processing is completed (Step 48).

Figure 7:
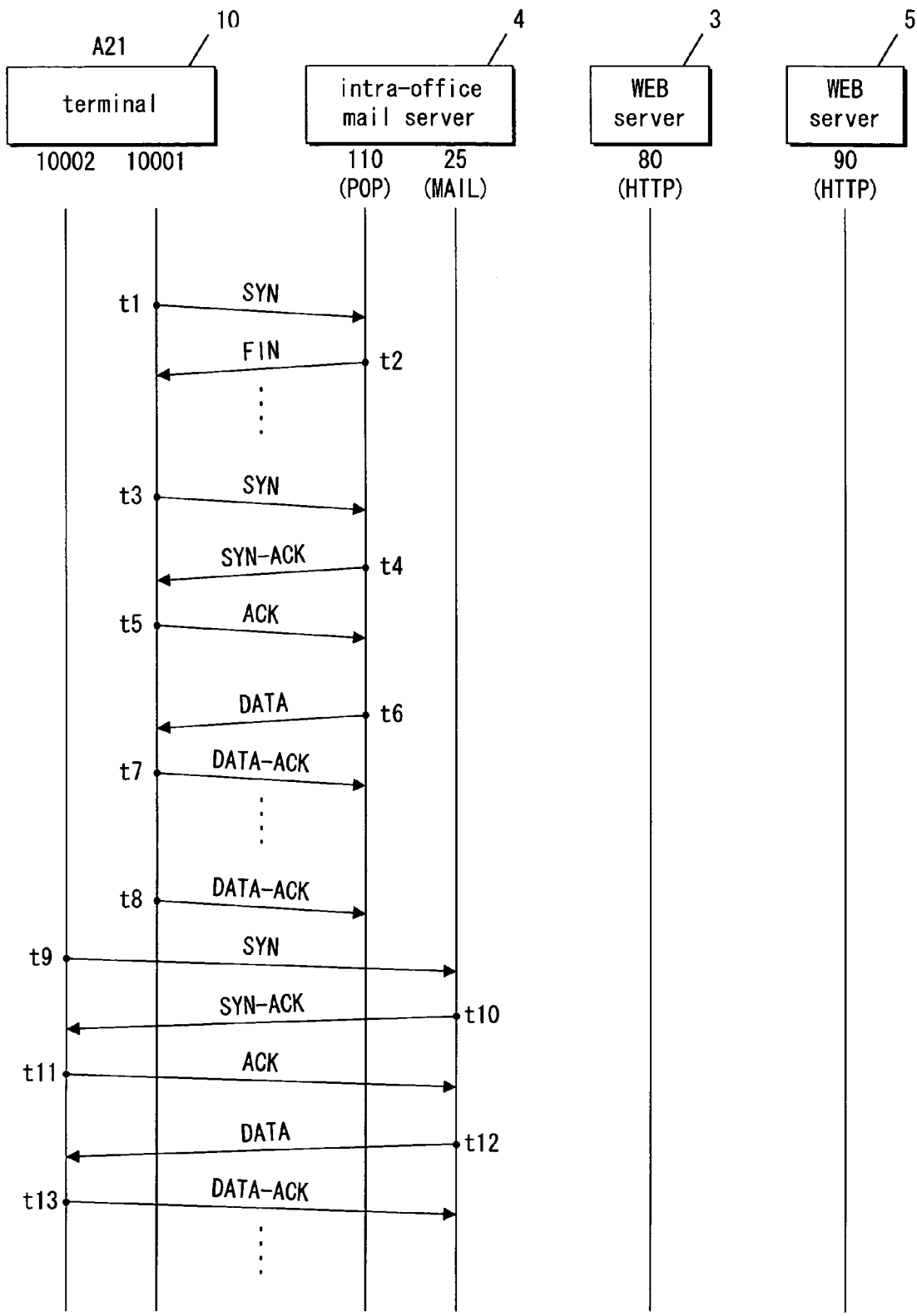
FIG. 7 is a time chart showing packet transmission according to the first embodiment.

The flow of processing for communication between the terminal 10 and the intra-office mail server 4 is explained using FIGS. 7 and 3. The flow begins with requesting by the terminal 10 for the connection with the intra-office mail server 4 under limited conditions, acknowledging the connection, loosening the conditions, and ending with starting smooth communication.

First, at time t1 of FIG. 7, the terminal 10 sends a packet (information including authentication information, such as an account and a password) whose SYN flag is "ON" to the intra-office mail server 4 according to the POP protocol. At this time, the contents of the storing unit 48 and the storing unit 67 are as shown in FIG. 3 (a).

Since the packet belongs to the flow number 4, the communication is acknowledged if the measured value V4 of the flow is less than the threshold TH.

However, in the present example, at around the time t1, the measured value V4 is unfortunately greater than the threshold TH; therefore, communication fails and a packet whose FIN flag is "ON" is sent back to the terminal 10 from the intra-office mail server 4 at time t2.

The terminal 10 reduces the transmission speed of the packet, and sends the packet whose SYN flag is "ON" to the intra-office server 4 once again at time t3. Then, the above-mentioned limited conditions are fulfilled, and a packet whose SYN-ACK flag is "ON") and acknowledges the connection from the intra-office mail server 4 to the terminal 10 is returned at time t4.

At this time, the contents of the storing unit 48 once change, as shown in FIG. 3 (b). Thus, a new entry (flow number 5), which has copied the contents of the flow number 4, is created, and each value, such as the address of the terminal 10 and the port number, is set.

As shown in FIG. 3 (c), as for the flow number for which the connection is acknowledged, the threshold TH is expanded to infinity from "10", and the conditions are loosened. Then, the intra-office mail server 4 notifies the repeater 6 of the change with a change notice. Therefore, the contents of the storing unit 67 also agree with the contents of FIG. 3(c).

After time t5, smooth communication by a large bandwidth is performed.

At time t9, in order to receive the mail service itself this time, the terminal 10 sends a packet (information including a password) whose SYN flag is "ON" to the intra-office mail server 4 according to the MAIL protocol.

Then, as shown in FIG. 3 (d), the intra-office mail server 4 adds a new entry (flow number 6), and the communication by the MAIL protocol is executed. Of course, change of the storing unit 48 at this time is immediately notified to the repeater 6, and the changed contents of the storing unit 48 are immediately reflected in the storing unit 67.

According to the present invention, instead of alternative-access controls such as transmission/discard, a more flexible access control can be performed within the limits of the bandwidth, which is controlled not to cause difficulties for other legal access communications.

Furthermore, according to the present invention, accurate judgment regarding the access control for the connectionless communication or the encrypted communication, which has been difficult with the prior art, can be made, by sending access control information to the repeater from the inside network.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of controlling access of a terminal to a server, the access being controlled via a repeater, the terminal being from an outside network and the server being from an inside network, the inside network and the outside network being connected via the repeater, and the method comprising:
   permitting, via the repeater, a transmission of packets from the terminal to the server, and limiting, via the repeater, the transmission of the packets according to first conditions stored in a memory of the repeater, the packets including authentication information;
   when the server acknowledges a connection between the server and the terminal in which the transmission of the packets is limited according to the first conditions and after permitting the transmission of the packets according to the first conditions, changing the first conditions limiting the transmission of the packets by generating second conditions from the first conditions; and
   controlling the repeater to limit the transmission of the packets according to the second conditions stored in the memory of the repeater,
   wherein each of the first conditions and each of the second conditions represent a bandwidth limitation of the transmission of the packets,
   wherein the bandwidth limitation represented by each of the first conditions is narrower than the bandwidth limitation represented by the second conditions, and
   wherein the method further comprises:
      connecting a first communication unit of the repeater to the outside network;
      connecting a second communication unit of the repeater to the inside network;
      storing information in a memory of a storing unit of the repeater, the stored information defining a correlation between (i) a flow of packets transmitted via the first communication unit and the second communication unit, (ii) a bandwidth threshold value of the flow of packets, and (iii) a measured bandwidth value of the flow of packets;
      classifying, via a classifying unit of the repeater, a flow of a packet according to the information stored in the storing unit defining the flow of the packet, and generating a classified flow, via the classifying unit; and
      measuring, via a measuring unit of the repeater, a bandwidth of the classified flow, generating, via the measuring unit, a measured value based on the measured bandwidth, and storing the measured value within the information stored in the storing unit defining the classified flow.

2. The method according to claim 1, wherein the changing of the conditions by generating the second conditions includes changing conditions of a flow defined by (i) an address of the terminal, (ii) a port number of the terminal, (iii) an address of the server, and (iv) a port number of the server.

3. The method according to claim 1, further comprising:
   storing access control information in the server;
   storing the access control information in the repeater; and
   when the access control information is changed by the server, notifying the repeater that the access control information has changed.

4. The method according to claim 1 further comprising:
   comparing, via a judging unit of the repeater, the measured bandwidth of the classified flow with a bandwidth threshold value of the information in the storing unit defining the classified flow, the bandwidth threshold value of the classified flow being represented by the first conditions, and judging, via the judging unit, whether or not transmission of the classified flow is acknowledged; and
   transmitting, via at least one of the first communication unit and the second communication unit, packets belonging to the acknowledged classified flow, the transmitting being limited according to the second conditions representing the bandwidth threshold value of the classified flow.

5. The method according to claim 4, further comprising setting the bandwidth threshold value of the classified flow stored in the storing unit,
   wherein the bandwidth threshold value is set to a value that limits the transmission of the packets belonging to the classified flow to a narrow bandwidth, represented by the first conditions, until the server acknowledges the transmission of the classified flow, and
   wherein the bandwidth threshold value is set to a value that limits the transmission of the packets belonging to the classified flow to a wide bandwidth, represented by the second conditions and being a wider bandwidth than the narrow bandwidth, once the server acknowledges the transmission of the classified flow.

6. A server connected to an inside network, the server controlling access of a terminal of an outside network to the server, the inside network and the outside network being connected via a repeater, and the server comprising:
   a communication unit operable to connect to the inside network and transmit packets;
   a storing unit operable to store information defining a correlation between (i) a flow of packets transmitted via the communication unit, (ii) a bandwidth threshold value of the flow of packets, and (iii) a measured bandwidth value of the flow of packets;

a classifying unit operable to classify a flow of a packet according to information stored in the storing unit defining the flow of the packet and operable to generate a classified flow;

a measuring unit operable to measure a bandwidth of the classified flow, operable to generate a measured value based on the measured bandwidth, and operable to store the measured value within the information in the storing unit defining the classified flow;

a judging unit operable to compare the measured bandwidth of the classified flow with a bandwidth threshold value (i) of the information in the storing unit defining the classified flow and (ii) represented by a first condition, and operable to judge whether or not transmission of the classified flow is acknowledged; and a bandwidth control unit operable to transmit packets, via the communication unit, belonging to a classified flow of which transmission is judged to be acknowledged by the judging unit, wherein, until the server acknowledges the transmission of the classified flow, the bandwidth threshold value of the classified flow stored in the storing unit is a value represented by the first condition that limits the transmission of the packets to a first range, wherein, once the server acknowledges the transmission of the classified flow and the bandwidth threshold value of the classified flow is the value represented by the first condition, the bandwidth threshold value of the classified flow stored in the storing unit is changed to a value represented by a second condition that limits the transmission of the packets to a second range, and wherein the bandwidth threshold value represented by the first condition is narrower than the bandwidth threshold value represented by the second condition.

7. A server according to claim 6, wherein, when the information stored in the storing unit is changed, the communication unit is operable to notify the repeater that the information stored in the storing unit has changed.

8. A server according to claim 6, further comprising an encryption unit operable to decode an encrypted packet, wherein the communication unit is operable to notify the repeater of access control information concerning the encrypted packet.

* * * * *